United States Patent
Cobanov et al.

(10) Patent No.: US 10,234,850 B2
(45) Date of Patent: Mar. 19, 2019

(54) CONTROLLER HAVING A COMMUNICATIONS INTERFACE, RECEIVER AND METHOD FOR COMMUNICATION

(71) Applicant: FESTO AG & Co. KG, Esslingen (DE)

(72) Inventors: Ante Cobanov, Stuttgart (DE); Martin Wiesner, Ostfildern (DE); Manuel Braun, Stuttgart (DE); Ralf Blumentritt, Ostfildern (DE)

(73) Assignee: FESTO AG & CO. KG, Esslingen (DE)

( * ) Notice: Subject to any disclaimer, the term of this patent is extended or adjusted under 35 U.S.C. 154(b) by 362 days.

(21) Appl. No.: 15/179,001

(22) Filed: Jun. 10, 2016

(65) Prior Publication Data

US 2016/0363926 A1    Dec. 15, 2016

(30) Foreign Application Priority Data

Jun. 10, 2015    (DE) .................. 10 2015 210 621

(51) Int. Cl.
  *G05B 19/416*    (2006.01)
  *H04L 29/08*    (2006.01)
  *H04L 29/06*    (2006.01)
(52) U.S. Cl.
  CPC ............ *G05B 19/416* (2013.01); *H04L 67/12* (2013.01); *H04L 69/08* (2013.01); *G05B 2219/37371* (2013.01)

(58) Field of Classification Search
  CPC ........ G05B 19/416; H04L 69/08; H04L 67/12
  See application file for complete search history.

(56) References Cited

U.S. PATENT DOCUMENTS

| | | | |
|---|---|---|---|
| 7,188,621 B2 * | 3/2007 | DeVries | A61M 16/0051 128/200.24 |
| 7,643,895 B2 * | 1/2010 | Gupta | A43B 3/0005 482/1 |
| 8,156,937 B2 * | 4/2012 | DeVries | A61M 16/026 128/200.24 |
| 8,961,185 B2 * | 2/2015 | Bleich | A61B 5/0456 434/247 |
| 9,131,508 B2 * | 9/2015 | Lindner | H04W 52/0277 |
| 9,413,676 B2 * | 8/2016 | Bandyopadhyay | H04L 47/522 |
| 9,441,758 B2 * | 9/2016 | Maichl | F15B 19/005 |
| 9,620,031 B2 * | 4/2017 | Schietinger | G09B 25/025 |

(Continued)

FOREIGN PATENT DOCUMENTS

| | | | |
|---|---|---|---|
| CN | 106246979 A | * 12/2016 | .......... G05B 19/416 |
| DE | 102004021750 | 12/2005 | |

(Continued)

*Primary Examiner* — Laura M Menz
(74) *Attorney, Agent, or Firm* — Hoffmann & Baron, LLP

(57) ABSTRACT

A controller for controlling an electric or a fluidic valve drive. The controller includes a communications interface which is configured to output a current signal and convert drive-related measurement information into a current signal level within a current interval according to a communications protocol. The communications interface is further configured to convert at least two different items of device status information into different current signals levels outside of the current interval.

10 Claims, 4 Drawing Sheets

(56) References Cited

U.S. PATENT DOCUMENTS

| | | | | |
|---|---|---|---|---|
| 9,746,344 B2* | 8/2017 | Heineck | ............... | G01D 18/004 |
| 9,830,833 B2* | 11/2017 | Bleyer | ................... | G09B 23/00 |
| 9,857,806 B2* | 1/2018 | Maichl | ................ | F15B 13/0857 |
| 9,909,679 B2* | 3/2018 | Turnaus | ................... | F15B 21/02 |
| 9,964,934 B2* | 5/2018 | Graff | ...................... | G05B 15/02 |
| 2015/0168928 A1* | 6/2015 | Graff | ...................... | G05B 15/02 |
| | | | | 700/23 |
| 2016/0363926 A1* | 12/2016 | Cobanov | ............. | G05B 19/416 |

FOREIGN PATENT DOCUMENTS

| | | |
|---|---|---|
| DE | 102005027047 | 12/2006 |
| DE | 102011111558 | 2/2013 |
| DE | 102011085877 | 5/2013 |

* cited by examiner

CONTROLLER HAVING A COMMUNICATIONS INTERFACE, RECEIVER AND METHOD FOR COMMUNICATION

BACKGROUND OF THE INVENTION

The invention relates to a controller for controlling an electric or a fluidic valve drive, having a control device which is configured to supply control signals for the valve drive and to receive drive-related measurement information detected by a sensor system, and having a communications interface which is configured to output a current signal and convert the drive-related measurement information into a current signal level within a current interval according to a communications protocol.

The invention further relates to a receiver for communication with a controller, wherein the receiver is configured to receive the current signal output by the controller, to detect the current signal level thereof and to convert a detected current signal level within the current interval into drive-related measurement information.

Finally, the invention relates to a method for communication between a controller for controlling an electric or a fluidic valve drive and a receiver.

From the prior art, a controller is known which is used to control an electric or a fluidic valve drive. The valve drive and/or the associated valve is/are monitored by a sensor system which detects a specific measured variable, such as, for example, the position of a piston, and transmits this to the controller as drive-related measurement information. The controller, in turn, transmits the measurement information via an analogue current interface to a receiver, such as, for example a programmable logic controller.

Transmission of the measurement information via the analogue current interface is configured according to a communications protocol. In particular, the analogue current interface is set up to transmit the measurement information in a current interval of 4 mA to 20 mA. This means different measured values of the measurement information are mapped onto/converted to different current signals levels within the current interval of 4 mA to 20 mA and then transmitted to the receiver.

The receiver receives the current signal, detects the current signal level and converts this into the measurement information. The receiver is therefore informed about the measured variable detected at the valve drive and/or valve and can use this, for example, for monitoring and/or controlling the controller and associated valve drive.

SUMMARY OF THE INVENTION

It is an object of the invention to improve the interplay between the controller and receiver, enabling the receiver to monitor the controller more comprehensively.

This object is achieved by a controller for controlling an electric or a fluidic valve drive, having a control device which is configured to supply control signals for the valve drive and to receive drive-related measurement information detected by a sensor system, and having a communications interface which is configured to output a current signal and convert the drive-related measurement information into a current signal level within a current interval according to a communications protocol, wherein the control device is further configured to generate at least two different items of device status information, and the communications interface is further configured to convert the at least two different items of device status information into different current signals levels outside of the current interval.

The controller according to the invention is therefore configured to generate at least two items of device status information and to transmit these via the communications interface. A receiver communicatively connected to the controller according to the invention can consequently be informed more comprehensively about the operation or the statuses of the controller and therefore monitor the controller better. As a result, the interplay between controller and receiver may be improved.

The at least two items of device status information preferably each relate to an operating state of the controller, the valve drive, a valve associated with the valve drive and/or a further external device connected to the controller. For example, one or both of the at least two items of device status information constitute(s) initialisation information, calibration information, error code information, level exceedance information or parameter error information.

According to the invention, the at least two items of device status information are transmitted via the same communications interface that is also used for transmitting the drive-related measurement information received from the sensor system. Consequently it is not necessary to provide an additional communications interface, and the advantage envisaged by the present invention can be achieved inexpensively.

A further advantage of the invention lies in that the controller according to the invention may be downwardly compatible with conventional receivers. The downwards compatibility is ensured, in particular, in that the at least two items of device status information are converted into different current signal levels outside of the current interval and therefore do not occupy any current signal levels within the current interval according to the communications protocol. For this purpose, the at least two items of device status information are transmitted by means of current signal levels which lie above and/or below the current interval specified by the communications protocol. In particular, the current signal levels for the at least two items of device status information can lie above the highest and/or below the lowest current signal level.

The items of device status information can expediently be converted exclusively into current signal levels which lie above the current interval. Alternatively, the items of device status information can also be converted exclusively into current signal levels which lie below the current interval. It is also possible for a first item of device status information to be converted into a current signal level above the current interval and for a second item of device status information to be converted into a current signal level below the current interval. Furthermore, for the purpose of increased transmission reliability it is also possible for a first item of device status information to be converted into a first current signal level above the current interval and into a second current signal level below the current interval while a second device status interval is converted into a third current signal level above the current interval and into a fourth current signal level below the current interval. This approach can also be applied to more than two items of device status information.

The current signal levels mentioned here within and outside of the current interval can be, for example, fixed direct current values. This means each current signal level can constitute a specific direct current strength or a specific ampere rating.

According to the invention, the current interval specified by the communications protocol for transmission of the drive-related measurement information is retained. The measurement information is converted into a corresponding current signal level within the current interval according to the communications protocol. The communications protocol can specify, for example, a continuous current interval which is intended for transmission of the measurement information. The current signal level can assume preferably continuous values within the current interval. Alternatively, the communications protocol can also specify a plurality of discrete current signal levels within the current level.

Maintenance of the current interval specified by the communications protocol contributes to the advantage of the downwards compatibility mentioned above. In particular, the controller according to the invention can be operated in cooperation with receivers, which are configured to receive the items of device status information, as well as with conventional receivers, which are configured solely for communication within the current interval according to the communications protocol. The controller according to the invention is accordingly very versatile.

The drive-related measurement information is detected by a sensor system. The controller according to the invention is configured to receive the detected measurement information. For example, the sensor system can be provided separately from the controller according to the invention and comprise transmission means to transmit the measurement information to the controller. The controller can accordingly be configured to receive the measurement information detected by the sensor system. The sensor system can be associated with the valve drive and/or the valve driven by the valve drive. The sensor system is arranged, for example, in the valve drive and/or in the valve. If the sensor system is arranged in the valve drive the detected measurement information can be transmitted between the controller and the valve drive via a communications interface.

The drive-related measurement information detected by the sensor can constitute, for example, a quantitatively determinable property of the valve drive, the valve driven by the valve drive or a fluid influenced by the valve. For example, the measurement information constitutes the current actual position of a piston.

The electric and/or fluidic valve drive controlled by the controller according to the invention can be provided separately from the controller. Alternatively, the controller and valve drive can be supplied as an integrated unit. For example, controller and valve drive can be arranged in the same housing. The controller and valve drive can be communicatively connected to each other via an interface.

Said communications protocol is preferably a communications protocol used in process automation, via which controllers and receivers communicate with each other. The communications protocol provides, in particular, the current interval in which the current signals levels for transmitting the measurement information lie, for example between 4 mA and 20 mA. The communications protocol preferably relates to an analogue current output, in particular to the 4/20 mA standard. In particular, the communications protocol relates to the 4-20 mA analog current loop.

In one embodiment of the invention, the at least two items of device status information are different from an item of device failure information.

This means the at least two items of device status information do not merely indicate a failure of the controller but constitute, for example, one or more operating state(s) of the controller other than failure. The receiver, which receives this item of device status information that goes beyond mere failure information, can therefore be informed more comprehensively about the state of the controller.

In a further embodiment of the invention, the at least two items of device status information comprise at least one item of initialisation information, one item of calibration information, one item of error code information, one item of level exceedance information and/or one item of parameter error information.

For example, the at least two items of device status information can be selected from this group of different types of information. The at least two items of device status information can preferably each comprise the same types of the listed information. Alternatively, the at least two items of device status information can also each comprise different types of the listed information. As an example of the first case, the at least two items of device status information can each comprise an item of initialisation information. For example, a first item of device status information can indicate that an initialisation has begun and a second item of device status information can indicate that an initialisation has finished. Different stages of an initialisation process can expediently be shown. Different stages, for example the beginning or end, of a calibration process can likewise also be shown.

In the second case, in which the at least two items of device status information comprise different types of the listed information, a first item of device status information, for example, can indicate that the controller is in an initialisation state, and a second item of device status information can indicate that the controller is in a calibration state. In addition, a third, fourth and/or fifth item of device status information can constitute the remaining types of listed information—i.e. error code information, level exceedance information, and/or parameter error information.

The error code information can comprise an error code which is associated with a specific type of error. A first item of device status information can expediently constitute a first error code and a second item of device status information can constitute a second error code. The error code information preferably relates to an error which can be fixed by the system or the controller and/or the receiver itself. The receiver can preferably then send a specific command, according to the received error code, to the controller in order to cause the error to be fixed.

The level exceedance information can qualitatively show that a specific measured variable or variable, which is received and/or obtained by the controller, has exceeded or fallen below a predefined threshold value. In this connection, the specific value of the measured variable or the variable does not have to be transmitted additionally. The at least two items of device status information can each relate to different measured variables or variables.

The parameter error information can indicate that a parameter stored in the controller, valve drive and/or valve is incorrect. In this connection the control device can be configured to read and evaluate one or more parameter(s) stored in the controller, valve drive and/or valve. In accordance with the result of evaluation, an item of device status information can then communicate that a specific parameter is incorrect. The at least two items of device status information can preferably each relate to different parameters. In addition or alternatively, an item of device status information can also refer to a plurality of parameters and indicate, for example, that at least one of the plurality of parameters is incorrect.

In a further embodiment of the invention, the current interface is configured to convert the at least two items of device status information into different current signal levels which have a predetermined level difference from each other which is preferably at least 0.2 mA or 0.5 mA.

In particular, a minimum level difference between two adjacent current signal levels outside of the current interval is specified. This has the advantage that reliable detection of the respective current signal level can be ensured at the receiver. The minimum level difference can be chosen for the current signal level outside of the current interval as a function of the application. The minimum level difference is preferably 0.2 mA.

Incorrect transmission can be particularly serious in the case of the at least two items of device information to be transmitted, and a large minimum level difference is therefore advantageous in this connection. The minimum level difference can amount to 0.5 mA or more for the current signal level outside of the current interval.

In a further embodiment of the invention, the controller is configured to detect an item of device failure information, and the current interface is configured to convert the at least two different items of device status information into different current signal levels outside of the current interval with a predetermined maximum level duration, and to convert the item of device failure information into a current signal level outside of the current interval with a predetermined minimum level duration which is greater than the maximum level duration.

In particular, in this embodiment at least one item of device failure information can be transmitted outside of the current interval in addition to the at least two items of device status information. The device failure information can be converted into the same current signal level as one of the at least two items of device status information.

The distinction between device failure information and device status information may then be made by way of the respective duration for which the current signal level is held. A maximum level duration can be predetermined in this connection for this conversion of the device status information. This means that the level of the current signal is only held for a predefinable maximum duration for transmission of the device status information. Expediently, after expiration of the maximum duration, the level of the current signal is changed. The level of the current signal is preferably changed to a current signal level within the current interval according to the communications protocol.

For transmission of the device failure information, the level of the current signal is held for a predetermined minimum level duration which is greater than the maximum level duration. For transmission of the device failure information, the level of the current signal can preferably be set permanently to the current signal level representing the device failure information.

The device failure information can be transmitted, for example, if it should be indicated that the controller and/or an associated unit, such as, for example the valve drive or the valve associated with the valve drive, has a defect and needs, for example, to be serviced or replaced. In particular, the device failure information can relate to defects which cannot be automatically fixed by the system or controller and/or receiver.

The current strength 0 mA is preferably chosen for transmission of the device failure information. The device failure information itself can therefore still be communicated if the power supply of controller has failed.

In a further embodiment of the invention, the current interval according to the communications protocol comprises the interval from 3.8 mA to 20.8 mA. The current signal levels of 3.8 mA and 20.8 mA can constitute, for example, the lowest and highest defined current signal levels respectively for transmission of the drive-related measurement information. Alternatively, the current interval can also lie within the interval of 3.8 mA to 20.8 mA. The current interval preferably comprises the interval from 4 mA to 20 mA and the current signal levels of 4 mA and 20 mA constitute the lowest and highest defined current signal levels respectively for transmission of the drive-related measurement information.

The widespread Highway Addressable Remote Transducer (HART) communications system is based on the 4/20 mA standard already mentioned above and therefore likewise uses an interval of 4 mA to 20 mA. The present controller can therefore also be configured such that, within the interval from 4 mA to 20 mA, it outputs signals compatible with the HART communications system.

In a further embodiment of the invention, the current signal level, into which the items of device status information and/or the item of device failure information is/are converted, are less than or equal to 3.5 mA and/or greater than or equal to 21 mA. These current signal levels are preferably in an interval from 0 mA to 3.5 mA and/or 21 mA to 24 mA.

In a further embodiment of the invention, the communications interface comprises an analogue current interface. In particular, the current signal is output by the analogue current interface. An example of an analogue current interface is an analog current loop.

The above mentioned object is further attained for a receiver for communication with a controller according to any one of the preceding embodiments, wherein the receiver is configured to receive the current signal output by the controller, to detect the current signal level thereof and to convert a detected current signal level within the current interval into drive-related measurement information, wherein the receiver is also configured to convert at least two detected current signal levels outside of the current interval into two different items of device status information.

In particular, the current signal originates from an above-described controller and therefore has one or more of the above-described signal properties. The receiver is preferably configured to detect and accordingly convert a current signal having one or more of the above-described signal properties. In particular, the receiver is configured to perform conversions of detected current signal levels into measurement information, device status information and/or device failure information which each correspond to/behave inversely to the above-described conversions, undertaken by the controller, of measurement information, device status information and/or device failure information into current signal levels.

The receiver itself can preferably also be a controller of the type described above, which is configured to communicate with a further controller of the same type. Alternatively, the receiver can also be configured as a control system superordinate to the controller. In particular, the receiver can comprise control means and be configured to control a controller of the type described above according to the received device status information. The receiver is preferably realized as a programmable logic controller.

The above-described object is achieved by a method for communication between a controller for controlling an electric or a fluidic valve drive and a receiver, comprising the following steps: detecting first and second items of device status information, converting the first and second items of device status information into two different current signal levels outside of a current interval predefined for communication of drive-related measurement information according to a communications protocol, transmitting the current signal with the two current signal levels from the controller to the receiver, receiving the current signal at the receiver, detecting the current signal level of the current signal, converting the current signal level into the first and second items of device status information.

A controller and/or a receiver of the type described above is/are preferably used for the method.

BRIEF DESCRIPTION OF THE DRAWINGS

Exemplary embodiments of the invention are illustrated in the drawings, in which.

DETAILED DESCRIPTION

The same designations are used in the description of the figures below for components of the illustrated embodiments having the same function, so as to omit redundant descriptions of components having the same function.

Figure 1:
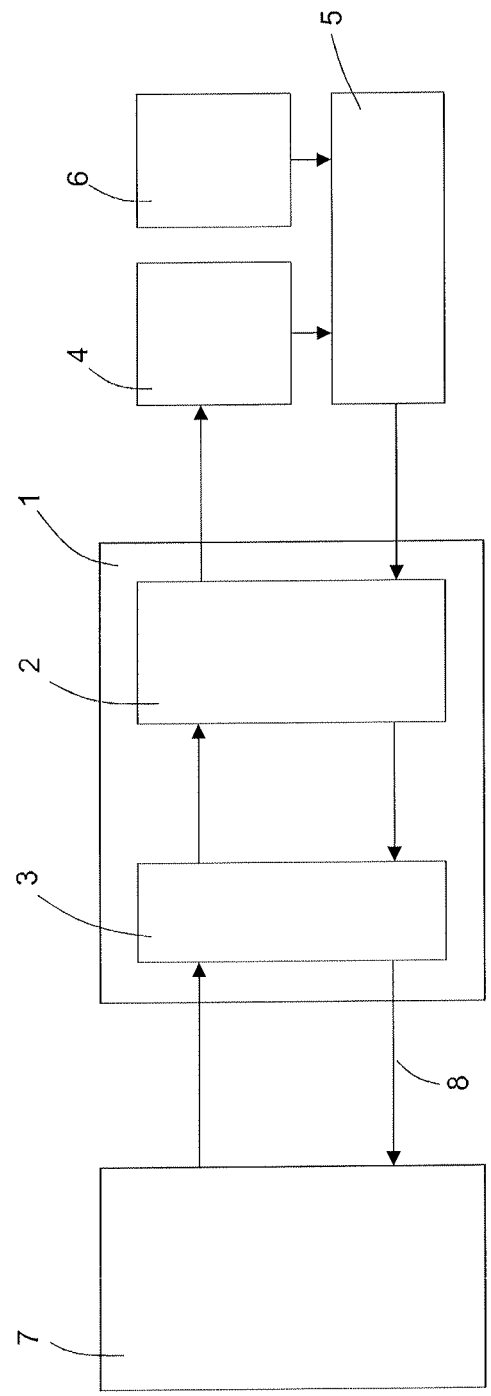
FIG. 1 shows a block diagram of an arrangement comprising the controller according to the invention and the receiver according to the invention.

FIG. 1 schematically shows an arrangement comprising the controller 1 according to the invention and the receiver 7 according to the invention. The arrows shown in FIG. 1 are intended to schematically indicate the direction of the flows of information between the various functional units.

The controller 1 comprises a control device 2 and a communications interface 3. An electric or a fluidic valve drive 4 is associated with the controller 1. The controller 1 is used to control the electric or fluidic valve drive 4 and has for this purpose the controller 2 which is configured to supply control signals for the valve drive 4 in order to cause a predefinable movement of the valve drive. As indicated in FIG. 1 by the arrow from the control device 2 to the valve drive 4, the control signals are transmitted from the control device 2 to the valve drive 4. This can occur by way of an appropriate transmission line or wirelessly.

A valve 6 is associated with the valve drive 4 and can be driven by the valve drive 4 according to the control signals received by the control device 2. A sensor system 5 is associated with the valve drive 4 and/or the valve 6 and is configured to detect a quantitatively determinable property of the valve drive, the valve 2 driven by the valve drive, or a fluid/mass flow influenced by the valve and to output this as drive-related measurement information to the controller 2.

The controller 1 also comprises a communications interface 3 which is configured to transmit information to the receiver 7 as a current signal. The communications interface 3 and the receiver 7 are preferably connected to each other by a transmission line 8. The communications interface 3 preferably comprises an analogue current interface. The transmission line 8 is preferably realized as a 2-conductor system or 3-conductor system. As a 3-conductor system, the transmission line 8 comprises, in particular, a supply line, a signal conductor and an earth conductor.

The communications interface 3 receives the measurement information from the controller 2 and converts the measurement information into a specific current signal level. This means the communications interface 3 impresses a direct current having a specific current strength into the transmission line 8 according to the current/present value of the measurement information. For transmission of the drive-related measurement information, the communications interface 3 preferably outputs a current signal that is continuous or analogue in the value range of the current interval.

The receiver 7 receives the current signal via the transmission line 8 and detects the level of the current signal. The receiver 7 then coverts the detected current signal level into measurement information.

According to the invention, the control device 2 is configured to generate at least two different items of device status information. The at least two different items of device status information are supplied to the communications interface 3. This converts the at least two different items of device status information into different, discrete current levels outside of the current interval and impresses a corresponding current signal on the transmission line 8.

The receiver 7 receives the current signal via the transmission line 8 and detects the levels of the current signal. The receiver 7 then converts the detected current signal levels into the at least two different items of device status information.

Figure 2:
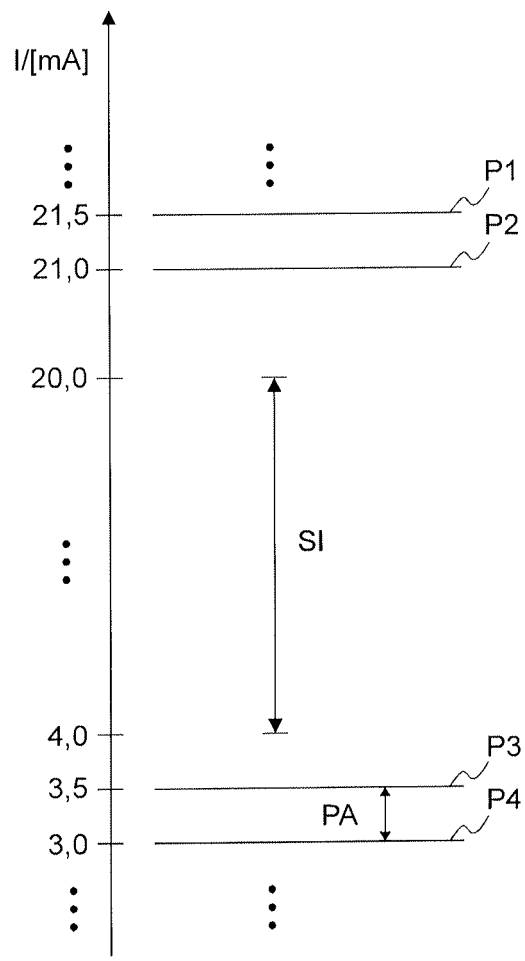
FIG. 2 shows a graph illustrating the current interval and different current signal levels outside of the current interval.

FIG. 2 shows a graph illustrating a current interval SI according to a communications protocol, and different current signal levels P1, P2, P3, P4 outside of the current interval. The current interval SI is used here for transmission of the drive-related measurement information and the current signal levels P1, P2, P3, P4 are used for transmission of the at least two different items of device status information.

As can be seen in FIG. 2, the current interval SI according to the communication protocol is preferably specified for the range from 4.0 mA to 20.0 mA. The measurement information is therefore mapped onto/converted to a current signal level between 4.0 mA and 20.0 mA as a function of the information's current/present value.

The current signal levels P1, P2, P3, P4, which are used for transmission of the at least two different items of device status information, are preferably greater than or equal to 21.0 mA and/or less than or equal to 3.5 mA. In the example shown in FIG. 2, the current signal levels P1, P2, P3, P4 assume the values 21.5 mA, 21.0 mA, 3.5 mA and 3.0 mA. At least two of the current signal levels can be chosen for transmission of the at least two items of device status information.

As indicated by the points in FIG. 2, the series of current signal levels, which are provided for transmission of the at least two items of device status information, can also be continued upwards or downwards. The list below shows an exemplary projection of the current signal levels up to 0 mA and 24 mA:

| Current value [ma] | Information to be transmitted |
| --- | --- |
| 0.0 | device status information 1 |
| 0.5 | device status information 2 |
| 1.0 | device status information 3 |
| 1.5 | device status information 4 |
| 2.0 | device status information 5 |
| 2.5 | device status information 6 |
| 3.0 | device status information 7 |
| 3.5 | device status information 8 |
| 21.0 | device status information 9 |

-continued

| Current value [ma] | Information to be transmitted |
|---|---|
| 21.5 | device status information 10 |
| 22.0 | device status information 11 |
| 22.5 | device status information 12 |
| 23.0 | device status information 13 |
| 23.5 | device status information 14 |
| 24.0 | device status information 15 |

Figure 3:
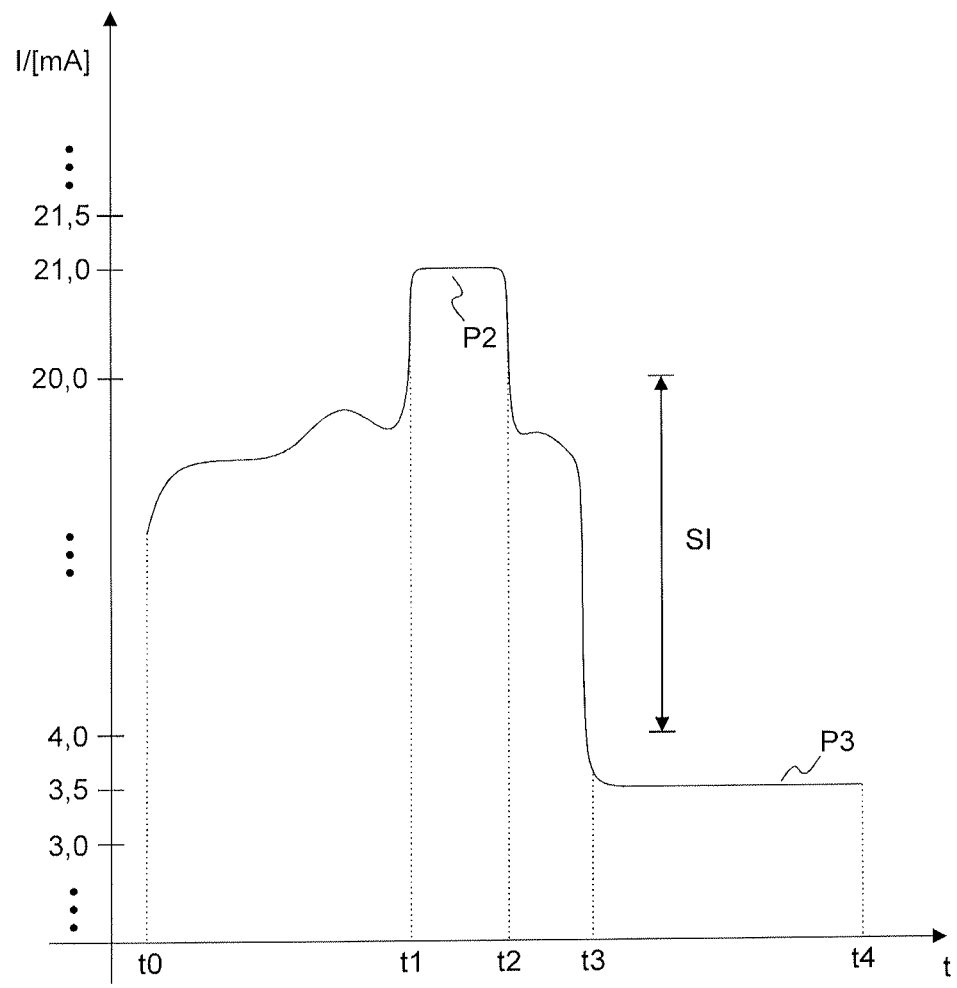
FIG. 3 shows a course over time of the current signal level of a current signal output by a controller.

FIG. 3 schematically shows a course over time of the current signal level of a current signal output by the communications interface 3 of the controller 1.

In the time domain from t0 to t1, the communications interface 3 converts drive-related measurement information into current signal levels that are continuous or analogue in the current value range within the current interval SI and impresses a corresponding current signal on the transmission line 8. As an alternative to the analogue current signal levels shown here, discrete current signal levels can also be used for coding individual measured values within the current interval SI.

At time t1, the control device 2 determines that a first item of device status information should be transmitted. The communications interface 3 converts the first item of device status information into a current signal level outside of the current interval. For example, the communications interface 3 converts the item of device status information, as shown in FIG. 3, into the current signal level P2 or 21.0 mA and impresses a corresponding current signal on the transmission line 8.

The current signal level P2 is held for a predetermined maximum level duration. Thereafter, the communications interface 3 resets the current signal level at its output to a value within the current interval SI. In particular, the communications interface 3 continues the conversion and transmission of drive-related measurement information. In the example shown in FIG. 3 this occurs at time t2.

From time t1 to time t2, the receiver receives no new drive-related measurement information via the communications interface 3. For this time domain, the receiver can simply retain or store the last-received drive-related measurement information. Up to receipt of new drive-related measurement information, the receiver can then work on the basis of the retained or stored drive-related measurement information. In this connection, reference is made to the fact that the ratios of the different time domains are not to scale in FIG. 3. In fact, the time domain t1 to t2 may be significantly shorter than the time domains t0 to t1 and t2 to t3 in which, as shown, the current signal level representing the drive-related measurement information changes considerably. The predetermined maximum level duration is preferably chosen in respect of the dynamic behaviour of the drive-related measurement information so as to be short enough that the value of the drive-related measurement information can change during the maximum level duration at most by a predetermined absolute value and/or percentage.

Before time t3, the control device 2 determines that there is apparatus failure. For example, the control device 2 finds that the actual position of a piston obtained as the drive-related measurement information deviates too much from a desired position. The control device 2 therefore provides the device failure information to the communications interface 3.

The communications interface 3 converts the device failure information into a current signal level P3, e.g. 3.5 mA, outside of the current interval SI and into a predetermined minimum level duration which is longer than the maximum level duration during which the items of device status information are transmitted. The communications interface 3 impresses a corresponding current signal on the transmission line 8. As can be seen in FIG. 3, the level P3 or 3.5 mA of the current signal is accordingly retained from time t3 to at least time t4.

The receiver 7, which receives this current signal and its current signal level, can therefore determine from the duration during which a current signal level is kept outside of the current interval SI, whether this relates to transmission of device status information or transmission of device failure information. For this purpose, the receiver 7 merely has to determine whether the duration of a current signal level outside of the current interval SI is greater than or equal to the predetermined minimum level duration.

Figure 4:
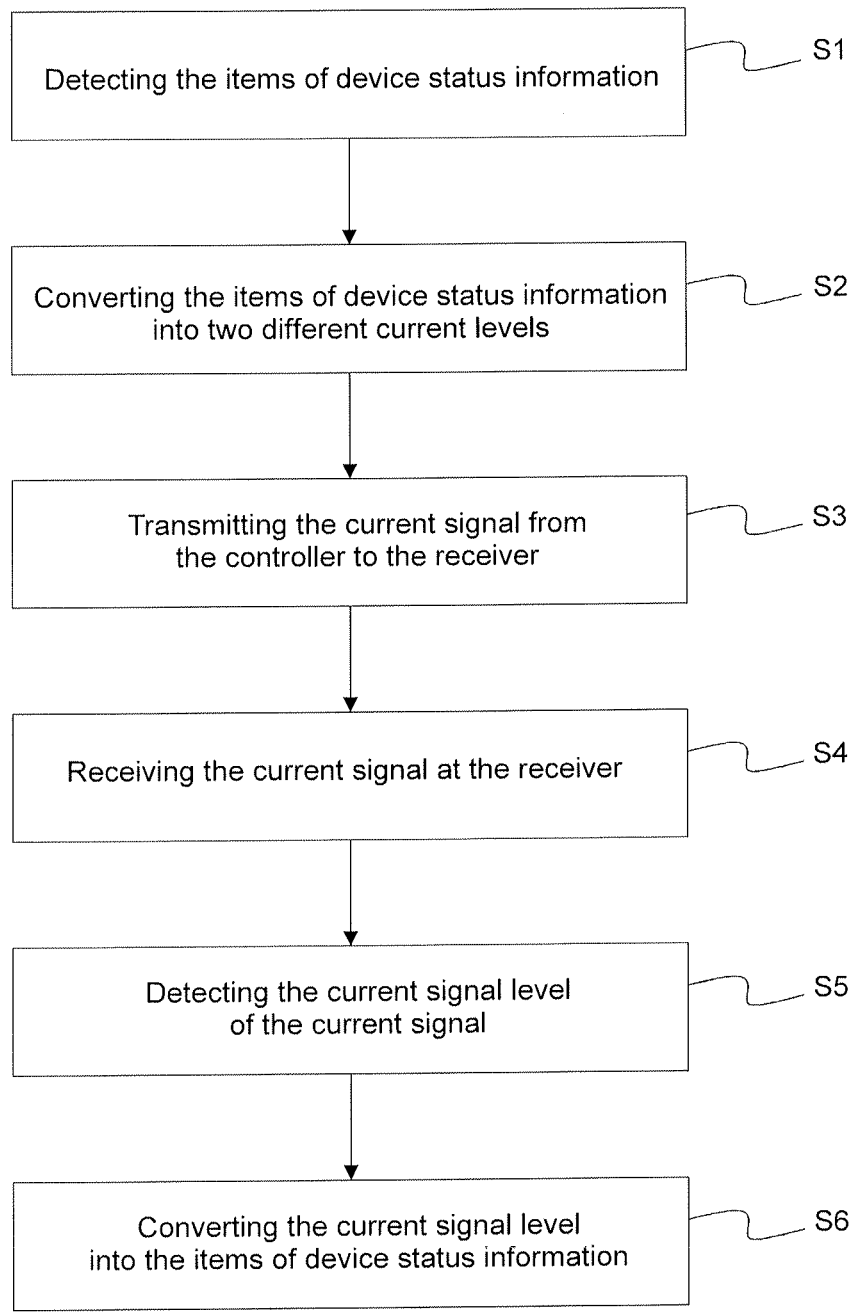
FIG. 4 shows a flowchart schematically showing steps of a method for communication between a controller and a receiver.

FIG. 4 shows a method for communication between a controller 1 for controlling an electric or a fluidic valve drive 4 and a receiver 7. The illustrated method comprises the following steps: detecting S1 first and second items of device status information, converting S2 the first and second items of device status information into two different current signal levels P1, P2, P3, P4 outside of a current interval SI predefined for communication of drive-related measurement information according to a communications protocol, transmitting S3 the current signal with the two current signal levels P1, P2, P3, P4 from the controller 1 to the receiver 7, receiving S4 the current signal at the receiver 7, detecting S5 the current signal level P1, P2, P3, P4 of the current signal, converting S6 the current signal level P1, P2, P3, P4 into the first and second items of device status information.

In particular the above-described controller 1 and/or the above-described receiver 7 may be used for the method.

The invention claimed is:

1. An arrangement, comprising an electric or fluidic valve drive, a controller for controlling the valve drive, and a sensor system for detecting drive-related measurement information, the controller having a control device which is configured to supply control signals for the valve drive in order to cause a predefinable movement of the valve drive and configured to receive the drive-related measurement information, the controller further having, as a communications interface, an analog current interface, which is configured to output a current signal and convert the drive-related measurement information into an analog current signal level within a current interval according to a communications protocol, wherein the control device is further configured to generate at least two different items of device status information, and the analog current interface is further configured to convert the at least two different items of device status information into different discrete current signal levels outside of the current interval, wherein the at least two items of device status information comprise at least one of initialisation information, calibration information, error code information, level exceedance information and parameter error information.

2. The arrangement according to claim 1, wherein the at least two items of device status information are different from device failure information.

3. The arrangement according to claim 1, wherein the sensor system is configured to detect, as the drive-related measurement information, the position of a piston.

4. The arrangement according to claim 1, wherein the current interface is configured to convert the at least two items of device status information into different current signal levels which have a predetermined level difference from each other.

5. The arrangement according to claim 1, wherein the control device is further configured to detect an item of device failure information, and the current interface is further configured to convert the at least two different items of device status information into different current signal levels outside of the current interval with a predetermined maximum level duration, and to convert the item of device failure information into a current signal level outside of the current interval with a predetermined minimum signal duration which is greater than the maximum level duration.

6. The arrangement according to claim 1, wherein the current interval according to the communications protocol comprises the interval from 3.8 mA to 20.8 mA.

7. The arrangement according to claim 1, wherein the current signal levels, into which the items of device status information and/or the item of device failure information are converted, are less than or equal to 3.5 mA and/or greater than or equal to 21 mA.

8. The arrangement according to claim 1, wherein the communications interface comprises an analogue current interface.

9. The arrangement according to claim 1, further comprising a receiver for communication with the controller, wherein the receiver is configured to receive the current signal output by the controller, to detect the current signal level thereof and to convert a detected current signal level within the current interval into drive-related measurement information, wherein the receiver is further configured to convert at least two detected current signal levels outside of the current interval into two different items of device status information.

10. A method for communication, in the arrangement according to claim 9, between the controller for controlling the electric or a fluidic valve drive and the receiver, the method comprising the following steps: detecting first and second items of device status information, converting the first and second items of device status information into two different current signal levels outside of a current interval predefined for communication of drive-related measurement information according to a communications protocol, transmitting the current signal with the two current signal levels from the controller to the receiver, receiving the current signal at the receiver, detecting the current signal level of the current signal, and converting the current signal level into the first and second items of device status information.

* * * * *